UNITED STATES PATENT OFFICE.

GEO. E. VAN DERBURGH, OF NEW YORK, N. Y.

IMPROVED SOLUTION FOR SATURATING NATURAL AND ARTIFICIAL STONE.

Specification forming part of Letters Patent No. 48,747, dated July 11, 1865.

*To all whom it may concern:*

Be it known that I, GEORGE E. VAN DERBURGH, of New York city, in the county and State of New York, have invented a new and useful Composition to be used in the Formation or Saturation of Artificial Building-Stones; and I do hereby declare that the following is a full and clear description thereof.

My improved composition is formed by the intimate admixture of liquid silicate with a saturated solution of lime-water, in proportions of one gallon of silicate to from three to six gallons of lime-water, the proportions varying according as the composition is to be used in the formation of building-blocks or for the saturation of artificial or natural stones.

In the formation of artificial stones a much larger proportion of silicate is required than when the composition is to be used as a saturating solution. In order to obtain the largest possible amount of lime in saturation, I prefer to sweeten the water with sugar or molasses or some saccharine equivalent—as starch, gum, &c.—in any proper proportion—say seven pounds of sugar or one gallon of molasses to fifty gallons of water—before adding the lime thereto, although an ordinary saturated solution of lime will alone answer my purpose.

I contemplate using this silicated composition in moistening the admixed lime and sand used in the formation of the so-called "Foster block," and as an ingredient in any and all forms of artificial building materials, as well as a bath in which to dip and saturate bricks and stones of all descriptions, or a paint or wash for walls.

This composition, forming a pure silicate of lime, will completely fill the interstices in any mass to which it may be applied or with which it is combined, making the mass or surface harder and tougher.

What I claim as my invention, and desire to secure by Letters Patent, is—

The within-described silicated composition for the purpose of saturating natural or artificial stones, or as an ingredient in the formation of the latter, substantially as herein set forth.

GEO. E. VAN DERBURGH.

Witnesses:
O. E. WALKER,
JNO. A. SNOOK.